United States Patent
Lee et al.

(10) Patent No.: US 10,579,531 B2
(45) Date of Patent: Mar. 3, 2020

(54) MULTI-LINE DATA PREFETCHING USING DYNAMIC PREFETCH DEPTH

(71) Applicant: Oracle International Corporation, Redwood City, CA (US)

(72) Inventors: Hyunjin Abraham Lee, San Jose, CA (US); Yuan Chou, Los Gatos, CA (US); John Pape, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 34 days.

(21) Appl. No.: 15/691,351

(22) Filed: Aug. 30, 2017

(65) Prior Publication Data

US 2019/0065377 A1  Feb. 28, 2019

(51) Int. Cl.
*G06F 12/0862* (2016.01)
*G06F 12/0855* (2016.01)

(52) U.S. Cl.
CPC ...... *G06F 12/0862* (2013.01); *G06F 12/0855* (2013.01); *G06F 2212/1016* (2013.01); *G06F 2212/602* (2013.01); *G06F 2212/6026* (2013.01)

(58) Field of Classification Search
CPC ............. G06F 12/0862; G06F 2212/602–6028
See application file for complete search history.

(56) References Cited

U.S. PATENT DOCUMENTS

| | | | |
|---|---|---|---|
| 6,412,046 B1* | 6/2002 | Sharma | G06F 12/0862 711/137 |
| 6,460,115 B1 | 10/2002 | Kahle | |
| 7,228,387 B2 | 6/2007 | Cai | |
| 7,380,066 B2 | 5/2008 | Griswell | |
| 7,904,661 B2 | 3/2011 | Fluhr | |
| 8,103,832 B2 | 1/2012 | Gara | |
| 2004/0205298 A1* | 10/2004 | Bearden | G06F 12/0862 711/137 |
| 2009/0300340 A1* | 12/2009 | Chou | G06F 9/3806 712/237 |
| 2011/0173397 A1* | 7/2011 | Boyle | G06F 12/0862 711/137 |

(Continued)

OTHER PUBLICATIONS

Jimenez et al. "Making Data Prefetch Smarter: Adaptive Prefetching on POWER7." Sep. 2012. ACM. PACT'12. pp. 137-146.*

(Continued)

*Primary Examiner* — Nathan Sadler
(74) *Attorney, Agent, or Firm* — Kowert, Hood, Munyon, Rankin & Goetzel, P.C.

(57) ABSTRACT

A system for prefetching data for a processor includes a processor core, a memory configured to store information for use by the processor core, a cache memory configured to fetch and store information from the memory, and a prefetch circuit. The prefetch circuit may be configured to issue a multi-group prefetch request to retrieve information from the memory to store in the cache memory using a predicted address. The multi-group prefetch request may include a depth value indicative of a number of fetch groups to retrieve. The prefetch circuit may also be configured to generate an accuracy value based on a cache hit rate of prefetched information over a particular time interval, and to modify the depth value based on the accuracy value.

20 Claims, 9 Drawing Sheets

(56) References Cited

U.S. PATENT DOCUMENTS

| | | | |
|---|---|---|---|
| 2011/0219208 A1* | 9/2011 | Asaad | G06F 15/76 |
| | | | 712/12 |
| 2012/0311270 A1* | 12/2012 | Sun | G06F 12/0862 |
| | | | 711/137 |
| 2014/0108740 A1* | 4/2014 | Rafacz | G06F 12/0862 |
| | | | 711/137 |
| 2015/0106590 A1* | 4/2015 | Chou | G06F 9/30072 |
| | | | 712/207 |
| 2017/0161089 A1* | 6/2017 | Frazier | G06F 9/45558 |

OTHER PUBLICATIONS

Srinath et al. "Feedback Directed Prefetching: Improving the Performance and Bandwidth-Efficiency of Hardware Prefetchers." Feb. 2007. IEEE. HPCA'07. pp. 63-74.*

Albericio et al. "ABS: A Low-Cost Adaptive Controller for Prefetching in a Banked Shared Last-Level Cache." Jan. 2012. ACM. ACM Transactions on Architecture and Code Optimization.*

* cited by examiner

MULTI-LINE DATA PREFETCHING USING DYNAMIC PREFETCH DEPTH

BACKGROUND

Technical Field

The embodiments disclosed herein generally relate to processors and, more particularly, to the implementation of data prefetch systems.

Description of the Related Art

To improve execution performance, a processor may include a prefetch circuit, also referred to herein as a prefetcher, for one or more cache memories to reduce memory access times. A prefetcher for a given cache may read data from a lower level cache or a system memory in anticipation of an upcoming request from the cache, i.e., fetch data before a processing core requests the data. A prefetcher may track memory access patterns corresponding to one of more software processes running in the processing core. Using these patterns, the prefetcher may then read data before the cache request it.

In some cases, an application running on a processor may access data in a stream-like pattern in which the application accesses many consecutive addresses, but not accesses are consecutive. Prefetching large amounts of data when such patterns are encountered may improve efficiency of the cache until an exception to the consecutive memory addresses is accessed.

SUMMARY

Various embodiments of a system for prefetching data for a processor may include a processor core, a memory configured to store information for use by the processor core, a cache memory configured to fetch and store information from the memory, and a prefetch circuit. The prefetch circuit may be configured to issue a multi-group prefetch request to retrieve information from the memory to store in the cache memory using a predicted address. The multi-group prefetch request may include a depth value indicative of a number of fetch groups to retrieve. The prefetch circuit may also be configured to generate an accuracy value based on a cache hit rate of prefetched information over a particular time interval, and to modify the depth value based on the accuracy value.

In a one embodiment, to modify the depth value, the prefetch circuit may be further configured to increase the depth value in response to a determination that the accuracy value satisfies an upper threshold value, and to decrease the depth value in response to a determination that the accuracy value satisfies a lower threshold value. In a further embodiment, to increase the depth value, the prefetch circuit may be further configured to maintain a current depth value in response to a determination that the current depth value is equal to a maximum allowed depth value.

In another embodiment, to decrease the depth value, the prefetch circuit may be further configured to suspend issuing prefetch requests for at least a next time interval in response to a determination that a current depth value is equal to a minimum allowed depth value. In an embodiment, to generate the accuracy value, the prefetch circuit may also be configured to track, over the particular time interval, a first value indicative of an amount of information stored, in response to one or more prefetch requests, in the cache memory. The prefetch circuit may be further configured to track, over the particular time interval, a second value indicative of a number of cache hits of cache lines that include information that is stored in the cache memory in response to at least one prefetch request.

In a further embodiment, the prefetch circuit may also be configured to determine the accuracy value based on the first value, the second value, and a weighted running average of the total amount of information stored, in response to one or more prefetch requests. In one embodiment, to issue the multi-group prefetch request, the prefetch circuit may be further configured to issue a number of single-group prefetch requests, wherein the number of single-group prefetch requests is based on the depth value.

BRIEF DESCRIPTION OF THE DRAWINGS

The following detailed description makes reference to the accompanying drawings, which are now briefly described.

Figure 1:
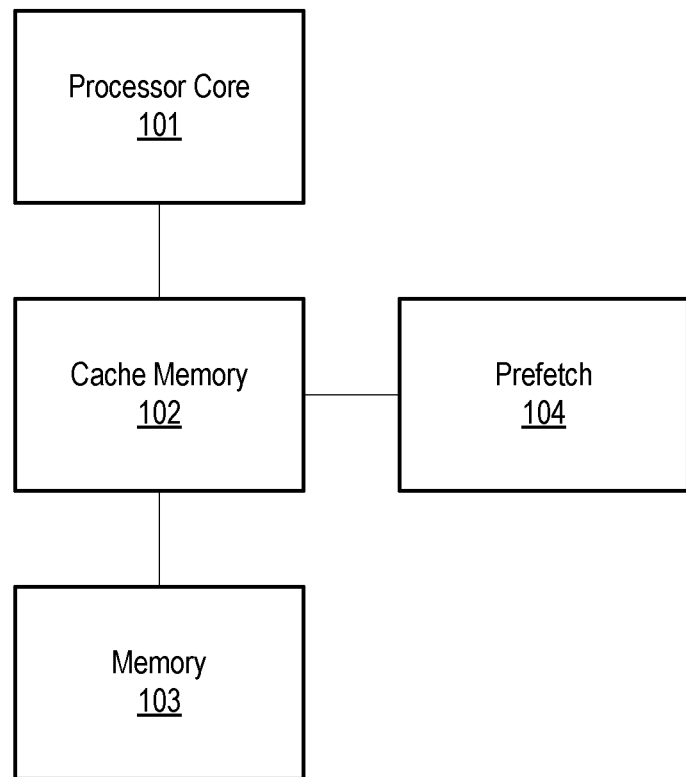
FIG. 1 is a block diagram illustrating an embodiment of a memory sub-system in a processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Generally speaking, a processor core (or simply, a "core") may refer to a unit of a processor that is capable of executing program instructions and processing data independently of other processor cores within the processor, such that multiple cores may execute instructions concurrently. Performance of a processor core may be impacted by a multitude of factors, including, but not limited to, processor clock speed, the number of cores in the processor, a number of cache memories (or simply "caches") in the processor, and a size of the included caches.

In some computing systems, a prefetcher may be utilized. As used herein, a "prefetcher" refers to a circuit configured to fetch one or more instructions before an execution unit or other processing circuit in a processor core request the one or more instructions. Working in combination with a cache, a prefetcher may improve a flow of information into a processor by anticipating which memory addresses may be accessed by a particular software process (also referred to herein as a "process thread") and reading the information from these addresses before the processor issues requests for the addresses. If the prefetcher has accurately anticipated the processor's data needs, then, in response to a memory request from a processor, the requested information may be available to the processor with little or no delay. As used herein, "information" refers to instructions and/or data values used by a processor or other processing logic in a computing system.

Data may be fetched from various memories by any of a variety of requestors. Each core in a multicore processor may generate memory requests from either a fetch unit or prefetcher. Some caches, which may be shared among two or more cores, may include a fetch circuit as well as prefetcher. The effectiveness of a prefetcher may be based, at least in part, on an ability of the prefetch circuits to recognize patterns in memory accesses of a process thread and to correctly predict when the pattern is repeating. Some process threads may access memory in large blocks of consecutive addresses, such as, for example, if a large media file is being played. In such cases, prefetching information in larger prefetch groups (i.e., a group of consecutive memory address to be prefetched) may improve an efficiency of memory access resources, resulting in improved performance of a computing system.

If, however, memory accesses by the process thread deviate from the consecutive addresses, then some of the information requested by the prefetcher will not be utilized. Such an occurrence may be referred to as an prefetch address misprediction or a prefetch miss.

Various embodiments of prefetchers and methods to manage the prefetching operations are discussed in this disclosure. The embodiments illustrated in the drawings and described below may provide techniques for managing a size of memory prefetch operations in a computing system that may reduce occurrences of mispredictions from the prefetchers.

A block diagram illustrating an embodiment of computing system is illustrated in FIG. 1. Computing system 100 includes processor core 101, coupled to cache memory 102. Cache memory 102 is further coupled to memory 103 and prefetch circuit 104.

Processor core 101 may be configured to execute instructions and to process data according to a particular Instruction Set Architecture (ISA). In various embodiments, processor core 101 may be configured to implement any suitable ISA, such as, for example, SPARC® V9, x86, PowerPC® or MIPS®. Additionally, in some embodiments, processor core 101 may be configured to execute multiple threads concurrently (referred to herein as being "multi-threaded"), where each thread may include a set of instructions that may execute independently of instructions from another thread. Although a single processor core 101 is illustrated, in other embodiments it is contemplated that any suitable number of cores may be included within a processor, and that each such core may be multi-threaded.

Cache memory 102 may reside within processor core 101 or may reside between processor core 101 and other memories. In one embodiment, cache memory 102 may be configured to temporarily store, or "cache," instructions and data for use by processor core 101. Cache memory 102 may correspond to any one of various levels of cache memory, such as, e.g., L1, L2, and L3. For example, one embodiment of a processor may include an L1 cache within processor core 101, while L2 cache may be represented by cache memory 102 and L3 cache is included as a part of memory 103. In a multicore processor, each core may have one or more L1 cache memories and may share one or more L2 and/or L3 caches. In various embodiments, cache memory 102 may be implemented using set-associative or direct-mapped techniques.

It is noted that an entry in cache memory 102 may be referred to as a cache line. Each cache line in cache memory 102 may include the data being stored, flags corresponding to the coherency state, and an address tag. A cache tag may include all or a part of the original address of the data being stored in the cache line, an index indicating in which cache line the cached data is stored, and an offset indicating where in each cache line the specific data is located. A given processor core may access a cache with a direct address of the memory location, a translated address based on lookup tables, or through an address calculated based on an instruction's address mode.

Memory 103, in the illustrated embodiment, includes system memory for storing information that may be used by processor core 101, including active software, such as, for example, an application or operating system being executed by processor core 101. In some embodiments, memory 103 may also include reserved locations for storing information in an L2 and/or L3 cache. In some embodiments, memory 103 may include one or more memory interfaces for accessing one or more types of system memory included on integrated circuits (ICs) that are separate from an IC including processor core 101. Such memory interfaces may be configured to manage the transfer of data between cache memory 102 and memory 103 in response to cache fetch requests. Memory 103 may include any suitable type of memory, such as Fully Buffered Dual Inline Memory Module (FB-DIMM), Double Data Rate Synchronous Dynamic Random Access Memory (DDR/DDR2/DDR3/DDR4 SDRAM), or Reduced Latency Dynamic Random Access Memory (RLDRAM), for example.

In the illustrated embodiment, prefetch circuit 104 uses predicted addresses to generate memory prefetch requests in order to fill one or more cache lines in cache memory 102 with information (i.e., data and or instructions) to be used by processor core 101. In systems with more than one level of cache memory, prefetch circuit 104 may generate memory prefetch requests for one cache memory, such as, for example, an L2 cache. In some embodiments, multiple prefetch circuits may be included, with each prefetch circuit generating memory requests for a particular cache memory. Prefetch circuit 104 may generate a memory prefetch request that results in information being retrieved from a higher level cache. For example, if prefetch circuit 104 generates prefetch requests for an L2 cache, then these prefetch requests may be sent to an L3 cache. As used herein, a "higher" cache or "higher" memory refers cache and memories that are farther removed from processor core 101 and "lower" cache refers to the opposite. For example system memory is higher than L3 cache, and L2 cache is lower than L3 cache. If a particular prefetch request misses in the L3 cache, then the L3 cache generates a memory fetch request for the requested information from system memory included in memory 103. As used herein, a cache "hit" refers to a request for information from a cache memory where the cache memory is currently storing the requested information, whereas a cache "miss" refers to the case in which the cache memory is not currently storing the requested information, and therefore has to retrieve the information from a higher level cache or system memory. Furthermore, a "cache hit rate," as used herein, may refer to a number of times a cache hit occurs within a particular time interval.

Successful prefetch requests may result in cache memory 102 receiving information before processor core 101 requests the information, thereby allowing processor core 101 to execute instructions without waiting for a memory access to return the requested information. In some cases, the information retrieved in response to a prefetch request, i.e., "prefetched information," may not arrive in cache memory 102 before processor core 101 is ready to use the information, but the prefetching may still reduce a time from when processor core 101 is ready for the information and when the information is available. Unsuccessful prefetch requests may result from an incorrect address prediction. Address prediction is based on the observation of patterns of addresses used for memory accesses over time. If processor core 101 deviates from this pattern, or if a pattern is incorrectly identified, then a misprediction may occur, resulting in information being retrieved when it isn't currently needed. Mispredictions may negatively impact performance by unnecessarily consuming processor resources and displacing useful information in the caches.

In some cases, prefetch circuit 104 may issue "multi-line" or "multi-group" prefetch requests. A "fetch group," as used herein, refers to the memory locations that are retrieved in a single prefetch operation. In some embodiments, a fetch group may correspond to information to fill one cache line of cache memory 102. In such cases, a "fetch line" may be used interchangeably with "fetch group." In other cases, a fetch group may not correspond to a cache line size, and instead include less information or more information than is stored in a given cache line. A "multi-group" prefetch request, as used herein, refers to a single prefetch request that results in a plurality of prefetch operations for retrieving multiple consecutively addressed fetch groups. In the illustrated embodiment, to issue a multi-group prefetch request, prefetch circuit 104 stores a depth value in a memory location or register. This depth value corresponds to a number of fetch groups that may be prefetched with a single multi-group prefetch request. For example, if the depth value currently has a value of four, then prefetch circuit 104 may issue a multi-group prefetch request to retrieve information from four fetch groups with consecutive fetch addresses. In various embodiments, the consecutive addresses may be in ascending or descending order of the address value.

Prefetch circuit 104, in the illustrated embodiment, also includes circuitry for monitoring an accuracy of the prefetcher. Using this monitoring circuitry, prefetch circuit 104 may adjust the depth value. The accuracy monitor tracks usage of information that is cached as a result of a prefetch request. If prefetched information is frequently used, then the corresponding accuracy of prefetch circuit 104 is high, and the depth value may be increased to take advantage of the current accuracy of prefetch circuit 104 by retrieving more information in each multi-group prefetch request. In contrast, if less prefetched information is used, then the corresponding accuracy may be lower and the depth value decreased in response. Additional details corresponding to multi-group prefetch adjustments are presented below.

It is noted that FIG. 1 is merely an example. The illustrated embodiment includes components related to the disclosed concepts. In other embodiments, additional components may be included. For example, other embodiments may include several levels of cache memory and/or multiple processor cores.

Figure 2:
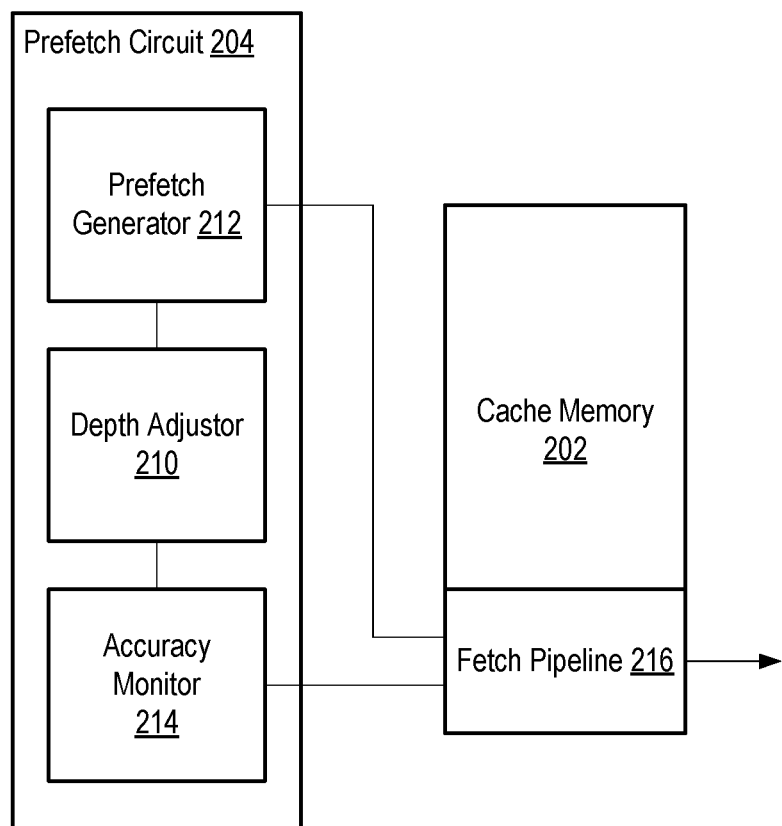
FIG. 2 shows a block diagram of an embodiment of a memory prefetching sub-system in a processor.

Turning to FIG. 2, a block diagram of an embodiment of a memory prefetching sub-system in a processor IC is shown. Memory sub-system 200 includes cache memory 202, and prefetch circuit 204. In addition, fetch pipeline 216 is coupled to cache memory 202 and prefetch circuit 204. In some embodiments, fetch pipeline 216 may be included as a part of cache memory 202 or as a separate circuit coupled to cache memory 202. Prefetch circuit 204, which may correspond to prefetch circuit 104 in FIG. 1, includes various sub-circuits, such as depth adjustor 210, prefetch generator 212, and accuracy monitor 214. In other embodiments, depth adjustor 210, prefetch generator 212, and accuracy monitor 214 may be coupled to prefetch circuit 204, rather than included within prefetch circuit 204.

Fetch pipeline 216, in the illustrated embodiment, includes hardware resources used to fetch information from higher level memories and fill cache lines in cache memory 202. In response to a cache miss in cache memory 202 resulting from a memory request from a processor core, such as, e.g., processor core 101 in FIG. 1, circuits in cache memory 202 cause fetch pipeline 216 to request the missing information from a higher memory, i.e., a higher-level cache, system memory, or a non-volatile memory. Similarly, prefetch circuit 204 may in the illustrated embodiment, issue prefetch requests utilizing fetch pipeline 216 to fill cache memory 202 with information that has been predicted to be accessed by processor core 101.

Prefetch generator 212, in the illustrated embodiment, issues prefetch requests to fill cache lines in cache memory 202 based on predicted addresses. Prefetch generator 212 may issue single-group or multi-group prefetch requests. To issue a multi-group prefetch request, prefetch generator 212 issues a number of single-group requests to fetch pipeline 216. The number of single-group fetch requests corresponds to the value of the depth value at the time the multi-group prefetch request is initiated. Prefetch generator 212 may include registers for tracking a number of single-group fetch requests issued for a particular multi-group prefetch request. In addition, prefetch generator 212 may include a queue in which the number of single-group prefetch requests are stored until they are issued to fetch pipeline 216.

In the illustrated embodiment, memory sub-system 200 includes accuracy monitor 214. Accuracy monitor 214 includes circuitry to monitor cache lines that were prefetched into cache memory 202 as a result of prefetch requests issued by prefetch circuit 204. Accuracy monitor 214 may increment two count values. The first count value corresponds to a total count value and is incremented for each cache line that is fetched by prefetch circuit 204. The second count value corresponds to a used count value and is incremented when one of these prefetched cache lines is accessed by a lower memory (e.g., an L1 cache or a fetch unit in processor core 101). Accuracy monitor 214 increments the two count values over a particular time interval. At the end of the particular time interval, accuracy monitor 214 determines, using the two count values, a value indicative of the accuracy of prefetch requests generated by prefetch circuit 204. For example, accuracy monitor 214 may generate an accuracy ratio by dividing the used count value by the total count value. In some embodiments, accuracy monitor 214 may additionally multiply the quotient by a predetermined value in order to generate a result with a value within a particular range of values. This accuracy value may then be sent to depth adjustor 210. Accuracy monitor 214 may clear the two count values and restart incrementing each value as described during a next time interval.

In some embodiments, accuracy monitor 214 may track a moving average of the total count value and used count value. In such embodiments, at the end of the particular time interval, the current total count value and the current used value may each be added to respective running average values. For example, at the end of the particular time interval, both the current total count and the average total count values may be divided by two (e.g., each binary value is shifted right by one digit), and then added together to generate a new average total count value. Such a running average may weigh the average total count value more heavily to the most recent total count values, while maintaining some influence for older total count values. A similar process may be used to generate an average used count value using the current used count value. After the average total count and average used count values are determined, the current total count and current used count values may be cleared for a next time interval while the newly determined average count values maintain their current value into the next time interval. An accuracy value may then be determined using the average count values using, e.g., a process as described for the accuracy ratio above.

Depth adjustor 210, in the illustrated embodiment, receives the accuracy value and determines whether the depth value is adjusted for a next time interval based on this accuracy value. Depth adjustor 210 compares the received accuracy value to an upper threshold and a lower threshold. If the accuracy value is higher than the upper threshold, then depth adjustor 210 may increment the depth value to increase a number of fetch groups retrieved with each multi-group prefetch request. By prefetching more fetch groups in a signal multi-group request, efficiency of memory sub-system 200 may be increased during times when an active process thread is accessing large amounts of consecutive data. In contrast, if the accuracy value is less than the lower threshold, then depth adjustor 210 may decrement the depth value to decrease a number of fetch groups retrieved with each multi-group prefetch request. By prefetching fewer fetch groups in a signal multi-group request, prefetch mispredictions may be reduced in memory sub-system 200 during times when an active process thread is requesting non-consecutive memory accesses.

In order to identify cache lines that were prefetched in cache memory 202, these prefetched cache lines may be flagged when stored in cache memory 202. For example, a cache line may include one or more bits (referred to herein as a "prefetch identifier," or "prefetch ID") set, after the prefetch occurs, to a particular value to indicate that the cache line was fetched in response to prefetch request issued by prefetch circuit 204, and reset to an alternate value otherwise. When an identified prefetched cache line is used, in addition to incrementing the current used count value, the prefetch ID may be reset. By resetting the prefetch ID after a first use of the corresponding cache line, each prefetched cache line may be counted once in determining the accuracy value. Otherwise, if a software process being executed by processor core 101 repeatedly accesses addresses associated with a particular cache line, the current used count value may be incremented for each access. This could generate a high accuracy value even if no other prefetched cache line is used. Counting each prefetched cache line only once may improve the usefulness of the accuracy value. It is noted that, if a prefetched cache line is used and then later cleared (i.e., evicted), and is then prefetched again later, the prefetch ID will be set after the second prefetch operation.

It is also noted that the system of FIG. 2 is merely an example and functional circuits are limited to emphasize the functionality of a memory prefetch system. In other embodiments, additional and/or different functional circuits may be included.

Figure 3:
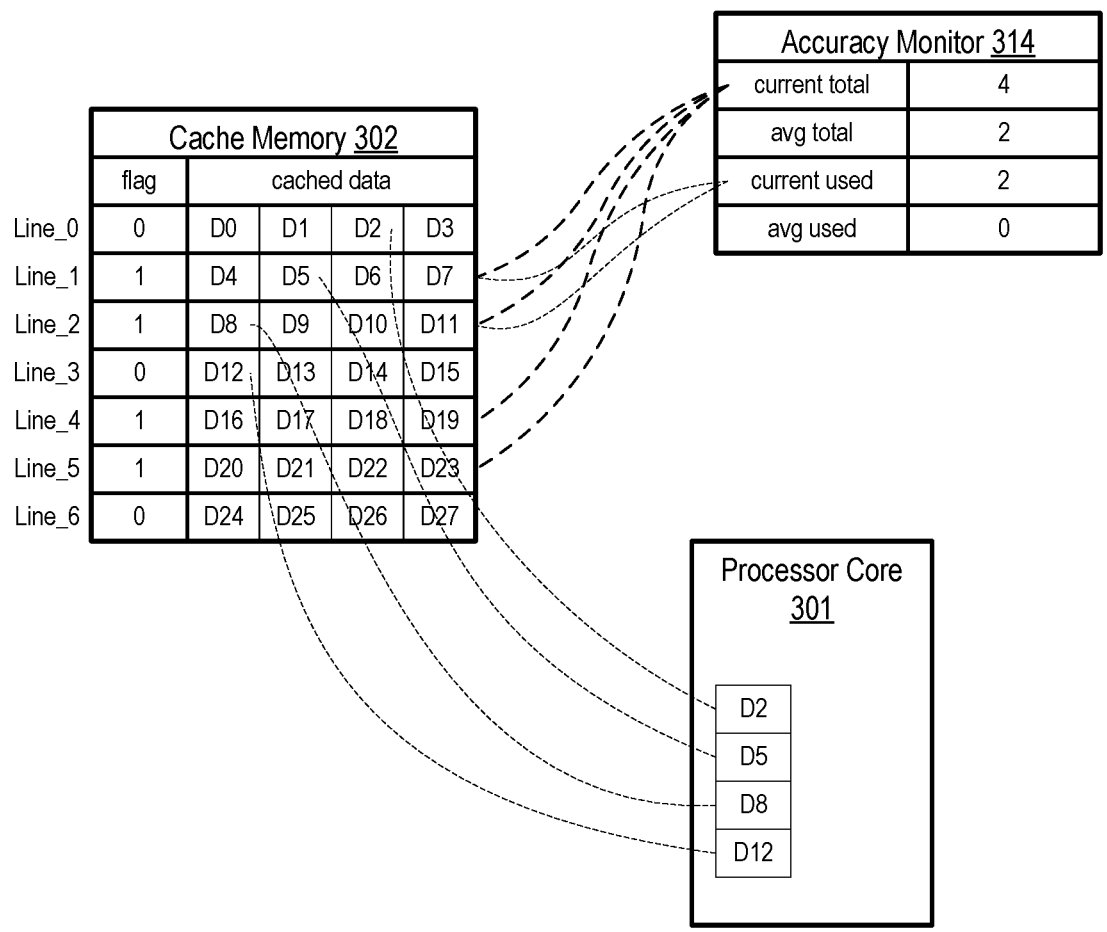
FIG. 3 depicts an embodiment of data tables associated with a cache and an accuracy monitor.

Additional details of the operation of an accuracy monitor are illustrated in FIG. 3. Data tables 300 illustrate an example of data tables associated with a cache and an accuracy monitor. In the illustrated embodiment, processor core 301 may correspond to processor core 101 in FIG. 1, and shows a portion of an instruction pipeline within the core. Cache memory 302 depicts a logical representation of how data is organized within a cache memory such as, for example, cache memories 102 or 202. Accuracy monitor 314 shows four values that may be tracked by an accuracy monitoring circuit such as, accuracy monitor 214, for example.

Cache memory 302 may correspond to any suitable cache memory in a processing system. In the illustrated embodiment, cache memory 302 corresponds to an L1 cache memory that is coupled to a prefetch circuit, such as, for example, prefetch circuit 204 in FIG. 2. Cache memory 302 may be organized into multiple cache lines as indicated by line_0 through line_6, with each line including cached information and a flag. Each line may hold any suitable number of bytes of information corresponding to a range of memory addresses. In the illustrated embodiment, four pieces of information are shown for each cache line, although any suitable number may be used in other embodiments. The cached information includes information fetched in response to a prefetch request from prefetch circuit 204 as well information fetched by fetch circuits in cache memory 302. Each cache line includes information about the cache line, including a bit to indicate if the respective cache line was fetched by fetch circuits in cache memory 302 (represented herein by a value of "0") or by prefetch circuit 204 (represented herein by a value of "1"). The cache line may include additional flags, as well as including a tag that includes references to the original address of the information in a system memory. Additional flags may include coherency data in relation to other memories, in which the same information may be stored and/or the type of information stored, such as instructions or data. For clarity, this additional information is not represented in FIG. 3.

As a software program is executed, processor core 301 may retrieve various pieces of information from cache memory 302. As shown, processor core 301 retrieves item D2 from line_0, item D5 from line_1, item D8 from line_2, and item D12 from line_3. As indicated by the flag for each cache line, line_0 and line_3 were fetched by the fetch circuits of cache memory 302, while line_1 and line_2 were fetched by prefetch circuit 204.

Accuracy monitor 314, in the illustrated embodiment, functions as described for accuracy monitor 214 above. Four values are tracked by accuracy monitor 314: a current total count, an average total count, a current used count, and an average used count. In some embodiments, the current total count value and the current used count value may be implemented as respective counter circuits. In the illustrated example, it is assumed that cache lines line_0 through line_6 have been fetched within a current time interval. In this current time interval, four of the fetched cache lines have been fetched by prefetch circuit 204, including line_1, line_2, line_4, and line_5. The remaining cache lines have been fetched by the fetch circuits of cache memory 302. In the current time interval, information from two of the prefetched cache lines, line_1 and line_2, have been used by processor core 301. It is noted that the flag value indicating that line_1 and line_2 were prefetched remains set to "1" in FIG. 3A. After accuracy monitor 314 increments the current used value to "2" as shown, the flag values of these two used prefetched cache lines will be reset to "0."

The values of average total count and average used count, as shown, may reflect the values after completion of the prior time interval. At the end of the current time interval, accuracy monitor 314 determines new values for both the average total count and the average used count, based on the values of the current total count and current used count at the end of the time interval. If the illustrated values reflect the count values at the end of the time interval, then, in one embodiment, accuracy monitor 314 determines the new average count values by dividing each value by two, and then adding the divided current total count (i.e., "2") to the divided average count (i.e., "1") to set a new average total count ("3"). The new average used value may be similarly determined, resulting in a new average used count of "1." Accuracy monitor 314 may then determine an accuracy value using the new values. In one embodiment, accuracy monitor 314 divides the new average used count ("1") by the new average total count ("3"), resulting in an accuracy value of 0.3333. This value may be multiplied by a suitable value to generate an integer value, such as, for example, by 100 to generate an accuracy value of 33 or by 1000 to generate an accuracy value of 333. In the illustrated embodiment, this accuracy value is sent to other circuits such as, for example, depth adjustor 210 in FIG. 2, in order to determine if the depth value is to be adjusted in the next time interval.

It is noted that the tables of FIG. 3 are merely an example. In other embodiments, additional information, such as related address information, may be included in cache memory 302. The tables of FIG. 3 are not intended to represent a physical arrangement of stored data in a cache memory or other circuits, but instead, are intended to merely illustrate a logical organization of data.

Figure 4:
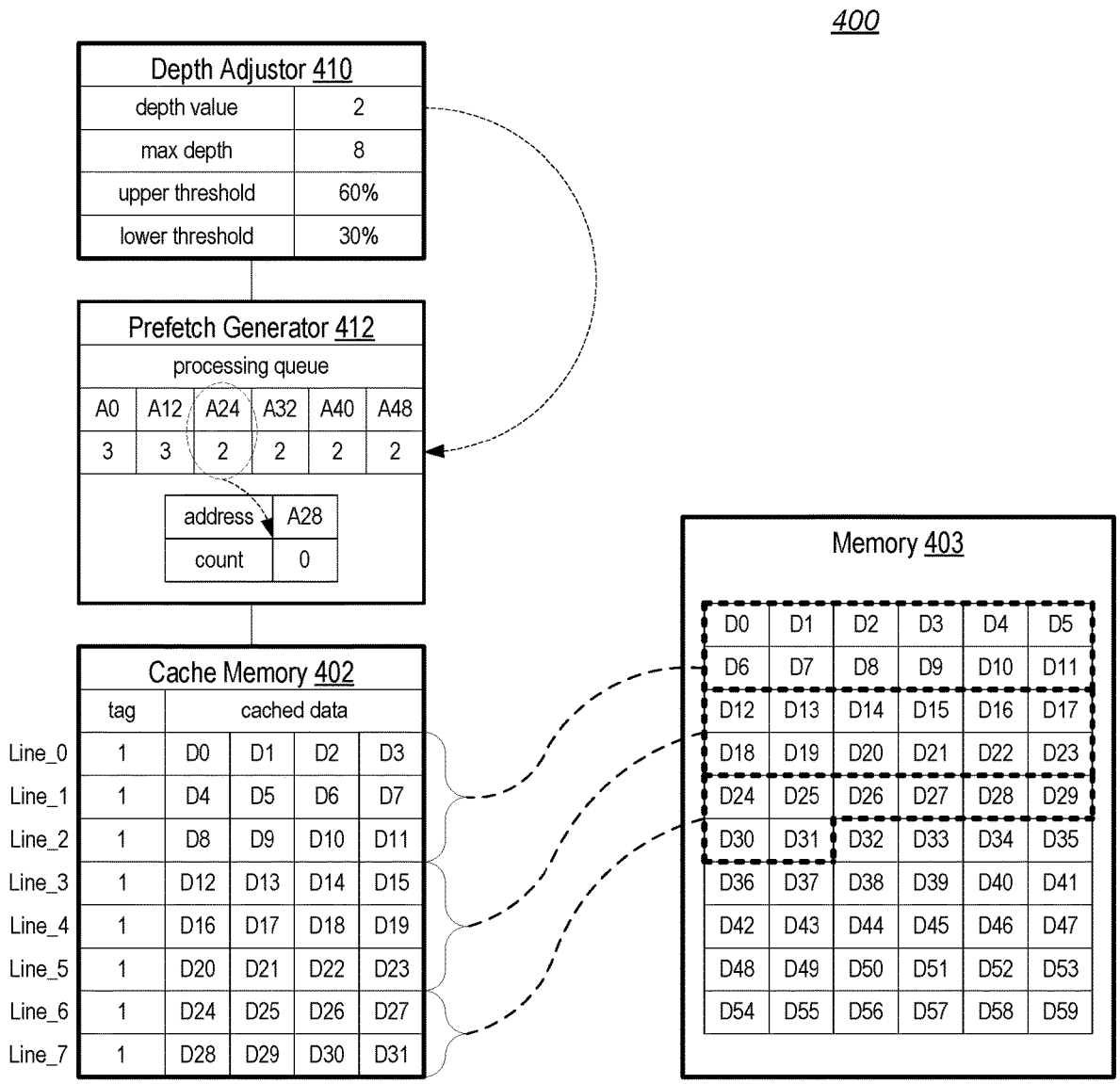
FIG. 4 illustrates an embodiment of data tables associated with a processor memory sub-system.

Moving to FIG. 4, additional data tables associated with a processor memory sub-system, such as, for example, memory sub-system 200 in FIG. 2, are depicted. Memory sub-system 400 includes cache memory 402, memory 403, depth adjustor 410 and prefetch generator 412. Cache memory 402 and memory 403 each depict a logical representation of how data may be organized within a cache memory and a system memory, respectively. Depth adjustor 410 includes four values: depth value and max depth, each of which are integer values, and upper threshold and lower threshold, each of which are percentage values. Prefetch generator 412 includes six entries in a processing queue as well as a current address and current count value.

In the illustrated embodiment, prefetch generator 412 generates and issues prefetch requests to fill cache lines in cache memory 402. In some embodiments, prefetch generator 412 corresponds to prefetch generator 212 of FIG. 2, and, therefore, is capable of generating multi-group prefetch request. In the present example, one fetch group corresponds to one line of cache memory 402, and prefetch generator 412 generates six multi-group prefetch commands, each with an address and a depth value, and stores them in the processing queue, with the oldest requests on the left-side of the queue.

To generate the first multi-group prefetch request, prefetch generator reads the depth value from depth adjustor 410 at the time the request is generated. In the example, the oldest request in the processing queue includes an address of "A0" and a depth value of "3," which correspond to the depth value at the time the request was generated. To process this request, prefetch generator 412 copies the address value into the current address register and the depth value into the current count value. Prefetch generator 412, in the illustrated embodiment, issues a single-group prefetch request to fetch circuits in cache memory 402, such as, for example, fetch pipeline 216. The single-group prefetch request is issued using the current address. In response to issuing this single-group prefetch request, prefetch generator 412 increments the current address by a value corresponding to a size of a fetch group, in this example, one cache line, i.e., 4 address locations. Prefetch generator 412 also decrements the current count value. When the current count value reaches "0," the multi-group prefetch request has completed and a next multi-group prefetch request is processed.

In the example of FIG. 4, the multi-group prefetch request with an address of "A24" is being processed. The current address is A28, reflecting that a second single-group prefetch request has been issued to cache memory 402 and cache line_7 is being filled with the corresponding data. The count value is "0" indicating that the last single-group prefetch request is being performed for the current multi-group prefetch request, and prefetch generator 412 may move to the next request with address value "A32." By issuing multi-group prefetch requests in this manner, the number of cache lines in cache memory 402 that may be filled by the prefetch requests in the processing queue may be increased. In the example, the six illustrated requests in the processing queue may fill 14 cache lines. If these six multi-group prefetch requests were replaced by single-group prefetch requests, then only six cache lines could be filled by the six requests. By issuing multi-group prefetch requests for information stored in consecutive addresses, the memory being accessed, memory 403 in this example, may also be able to provide the data in a more timely manner.

It is noted that between generating the request with address "A12" and the request with address "A24," the depth value was decreased from three to two. Prefetch generator 412 received an accuracy value that corresponded to less than 30% of the total prefetched cache lines being used in a particular time interval. In response, the depth value is decreased to limit a number of prefetches issued by prefetch generator 412 while the accuracy is below the lower threshold. If, in later time intervals, the accuracy value rises above the upper threshold, then the depth value may be incremented. As previously stated, in some embodiments, the accuracy value may remain below the lower threshold or above the upper threshold for two or more consecutive time intervals before the depth value is adjusted. If the accuracy value remains high, then the depth value may continue to be incremented by depth adjustor 410, until the max value is reached. The max value corresponds to a maximum allowable value for the depth value. The depth value may be limited to the max value for various reasons, such as to prevent the prefetch requests from overwhelming the memory fetching resources such as, e.g., fetch pipeline 216. In addition, if the depth value were to get too high, then the risk of a prefetch misprediction may increase.

In some embodiments, depth adjustor 410 may also include a minimum allowable depth value. If the current depth value is at the minimum allowable depth value and the accuracy value is below the lower threshold, then rather than continuing to reduce the depth value, prefetch requests may be suspended instead. Such a suspension may last for a predetermined number of time intervals. In the illustrated embodiment, the minimum allowable depth value may be fixed at "1," such that if the depth value is decremented to "0," then prefetch requests are suspended.

It is noted that the tables of FIG. 4 are merely an example. The tables of FIG. 4 are intended to illustrate a logical organization of data, and are not intended to represent a physical arrangement of stored data in the associated circuits. In other embodiments, additional information, such as related address information, may be included in cache memory 402. Actual amounts of data stored in any of the illustrated tables may be larger than what is shown in FIG. 4.

Figure 5:
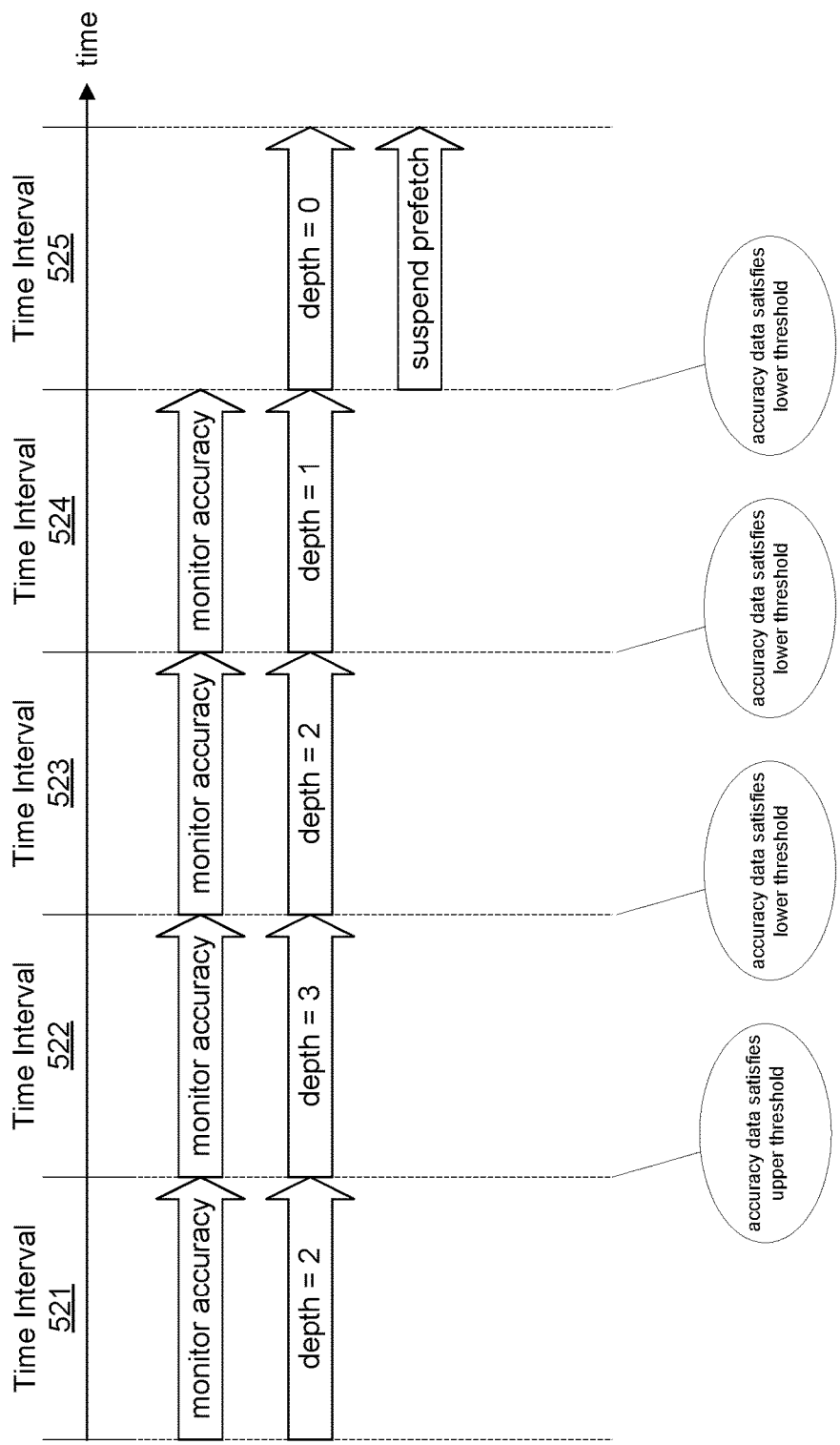
FIG. 5 includes an operational time line for an embodiment of a memory prefetching sub-system in a processor.

Proceeding to FIG. 5, an operational time line for an embodiment of a processor memory prefetching system is shown. Time line 500 may apply to the embodiments of computing system 100 or memory sub-system 200 in FIGS. 1 and 2, respectively. Time line 500, in the illustrated embodiment, includes five time intervals; time interval 521 through time interval 525. These time intervals may correspond to time intervals discussed above. Referring to memory sub-system 200 in FIG. 2 and to FIG. 5, time line 500 begins with time interval 521.

During time interval 521, prefetch circuit 204 is active and accuracy of prefetch request from prefetch circuit 204 is monitored by accuracy monitor 214. The depth value is currently set to two. At the end of time interval 521, accuracy monitor 214 sends a newly determined accuracy value to depth adjustor 210. In the illustrated embodiment, depth adjustor 210 determines that the accuracy value satisfies an upper accuracy threshold, and, in response, increments depth value from two to three.

In time interval 522, accuracy monitor 214 continues operation while prefetch circuit 204 may continue to issue prefetch requests. At the end of time interval 522, accuracy monitor 214 sends a new accuracy value to depth adjustor 210. Depth adjustor, in the current example, determines that the accuracy value satisfies a lower accuracy threshold and, in response, decrements depth value back to the value of two. Operation of accuracy monitor 214 may be the same in time intervals 523 and 524, as it was for time interval 522, and depth adjustor 210 may decrement the depth value from two to one at the end of time interval 523 and decrement again to a value of zero at the end of time interval 524. The reduced accuracy in time intervals 522 through 524 may be caused by a change in operation of a currently executing process thread. For example, the process thread may transition from reading a large file to performing a different task in which different memory locations are accessed, thereby causing a fall in the accuracy of the prefetch requests from prefetch circuit 204. By monitoring the accuracy of the prefetch operations, depth adjustor 210 may increase the depth value during times when the accuracy value is high, resulting in higher efficiency of the memory sub-system, and may also react to changing operation of a process thread and reduce the depth value during times of low accuracy, resulting in fewer prefetch mispredictions.

In some embodiments, the accuracy value may need to satisfy the upper or lower threshold values for two or more consecutive time intervals before depth adjustor 210 modifies the depth value. In the illustrated embodiment, satisfying a threshold for one time interval is sufficient to change the depth value.

It is noted that the time line of FIG. 5 is an example for demonstrating disclosed concepts. Although the time intervals are shown to be similar lengths, the amount of time in any given time interval may vary based on the monitored data. For example, if the accuracy value changes by large amount between consecutive time intervals, the length of future time intervals may be shortened until the accuracy value is more consistent between intervals.

Figure 6:
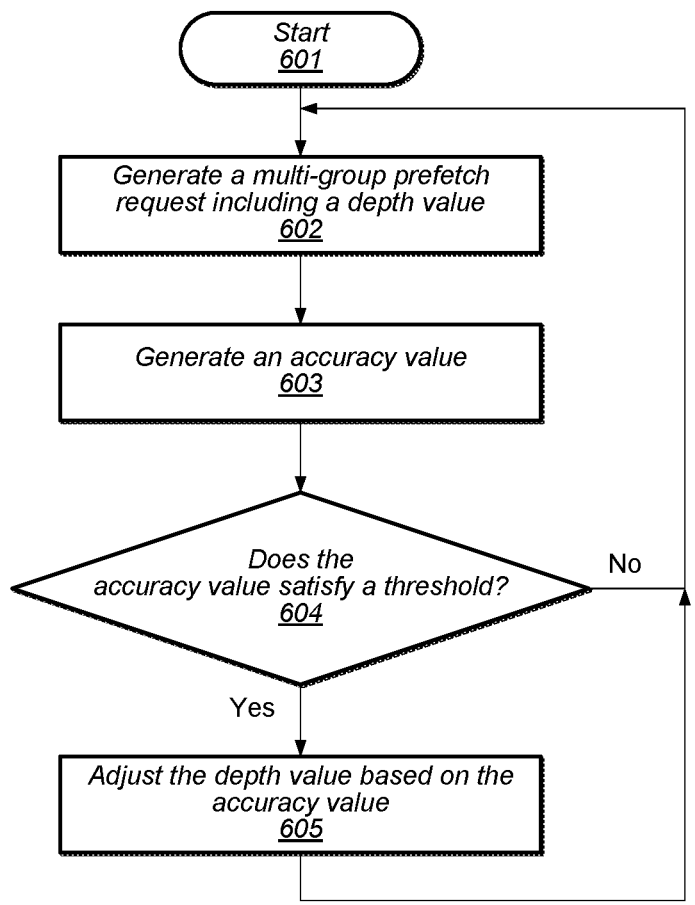
FIG. 6 depicts a flow diagram of an embodiment of a method for performing multi-group prefetch requests based on a determined accuracy.

Turning now to FIG. 6, a flow diagram of an embodiment of a method for performing multi-group prefetch requests based on a determined accuracy is depicted. In various embodiments, method 600 may be applied to a memory sub-system, such as, for example, memory sub-system 200 in FIG. 2. Referring collectively to FIGS. 2 and 6, method 600 begins in block 601.

A multi-group prefetch request is generated (block 602). Prefetch generator 212 generates a multi-group prefetch request which includes an address value and a current depth value corresponding to a number of fetch groups to process for this request. Each multi-group prefetch request may be stored in a processing queue, such as a first-in, first-out (FIFO) queue. In the illustrated embodiment, prefetch generator 212 initializes an address register based on the corresponding address value and a count value based on the stored value of the depth value. Prefetch generator 212 proceeds to issue a series of single-group prefetch requests to fetch pipeline 216 in order to perform the multi-group prefetch request, decrementing the count value for each single-group prefetch request issued. After the count value reaches zero, the multi-group prefetch requests has been completed and a next prefetch request from the processing queue may be processed.

An accuracy value is generated (block 603). Accuracy monitor 214 determines an accuracy value during a particular time interval. During the particular time interval, in the illustrated embodiment, accuracy monitor 214 tracks a total value corresponding to a number of fetch groups retrieved in response to a prefetch request as well as tracking a used value, corresponding to a number of cache line hits in cache memory 202 in which the cache line was filled in response to a prefetch request. Using these values, accuracy monitor 214 determines an accuracy value for the prefetch requests. Additional details regarding the determination of the accuracy value are presented below in regards to FIG. 8.

Further operations may depend on the accuracy value (block 604). In the illustrated embodiment, the accuracy value is sent to depth adjustor 210. Depth adjustor 210 compares the received accuracy value to one or more threshold values. In one embodiment, an upper threshold value and a lower threshold value are used for these comparisons. If at least one threshold is satisfied, for example, if the accuracy value is less than the lower threshold value or is greater than the upper threshold value, then the method moves to block 605 to adjust the depth value. Otherwise, the method returns to block 602 to generate another multi-group prefetch request.

The depth value is adjusted based on the accuracy value (block 605). If at least one threshold is satisfied, then depth adjustor 210, in the illustrated embodiment, modifies the depth value. For example, if the accuracy value is greater than the upper threshold value, then the depth value may be increased, allowing more information to be fetched in a next multi-group prefetch request. In contrast, if the accuracy value is less than the lower threshold, then the depth value may be decreased, reducing an amount of information fetched for a next multi-group prefetch request. Additional details for adjusting the depth value are presented below in FIG. 7. The method may return to block 602 to generate another prefetch request.

It is noted that method 600 of FIG. 6 is one example. The operations illustrated in FIG. 6 are depicted as being performed in a sequential fashion. In other embodiments, however, some operations may be performed in parallel or in a different sequence. For example, blocks 602 and 603 may be performed in parallel. In some embodiments, additional operations may be included.

Figure 7:
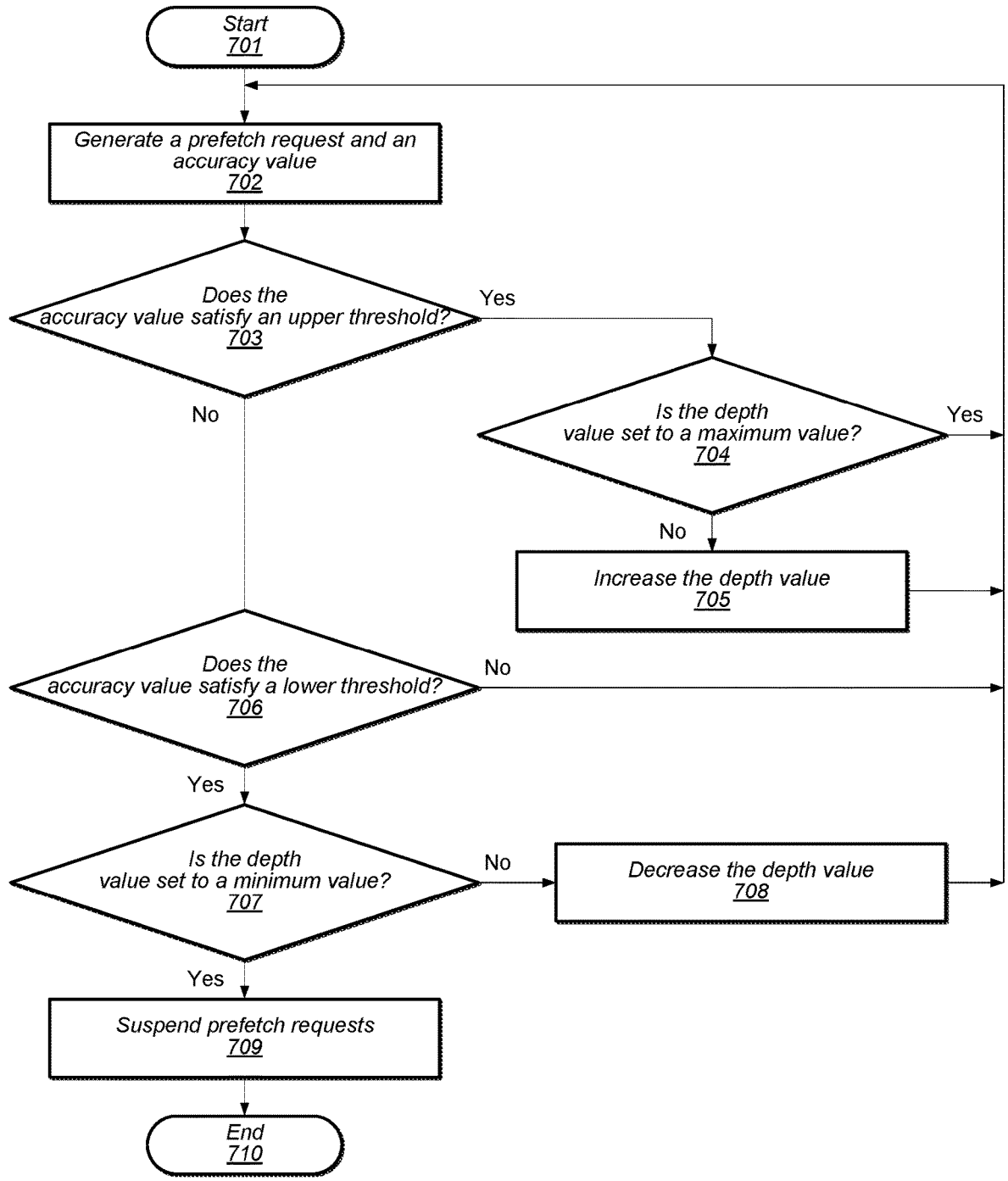
FIG. 7 illustrates a flow diagram of another embodiment of a method for performing multi-group prefetch requests based on a determined accuracy.

Moving now to FIG. 7, a flow diagram showing another embodiment of a method for performing multi-group prefetch requests based on a determined accuracy is illustrated. Method 700 is similar to method 600 of FIG. 6, with additional details regarding the adjustment of the depth value. Like method 600, method 700 may be applied to a memory sub-system, such as, for example, memory sub-system 200 in FIG. 2. Referring collectively to FIGS. 2 and 7, method 700 begins in block 701.

In the illustrated embodiment, a multi-group prefetch request and an accuracy value are generated (block 702). Similar to method 600, method 700 begins with prefetch generator 212 generating a multi-group prefetch request, with corresponding address and depth values, and storing the requests in a processing queue. While prefetch generator 212 creates the multi-group prefetch request, Accuracy monitor 214 tracks total and used values associated with prefetch requests. Accuracy monitor 214 tracks the total and used values over a particular time interval. This time interval may correspond to tens of processor cycles or to thousands of processor cycles or more. In some embodiments, prefetch generator 212 may generate tens of, thousands of, or more, prefetch requests during the particular time interval. At the end of the time interval, accuracy monitor 214 determines an accuracy value based on the tracked total and used values, as described for block 603 of method 600.

Further operations of the method may depend a value of the accuracy value and an upper threshold value (block 703). In the illustrated embodiment, depth adjustor 210 receives the determined accuracy value from accuracy monitor 214 and compares this value to an upper threshold value. If the accuracy value satisfies the upper threshold, e.g., the accuracy value is greater than or equal to the upper threshold, then the method moves to block 704 to determine if the current depth value is set to a maximum value. Otherwise, the method moves to block 706 to determine if the accuracy value satisfies a lower threshold.

If the accuracy value satisfies the upper threshold, then further operations may depend on a current value of the depth value (block 704). Depth adjustor 210, in the illustrated embodiment, compares the current depth value to a maximum value. If the current depth value equals, or in some embodiments, exceeds, the maximum value, then the method returns to block 702 without adjusting the current depth value. Otherwise, the method moves to block 705 to increase the depth value.

The depth value is increased in response to determining that the accuracy value satisfies the upper threshold and the current depth value is below the maximum depth value (block 705). If the current depth value is not already set to the maximum value, and the accuracy value indicates that the current accuracy of prefetch generator 212 satisfies the upper threshold, then, in the illustrated embodiment, the current depth value is incremented. In some embodiments, the depth value may be incremented by one, while, in other embodiments, any suitable increment may be used. The method then returns to block 702 to generate a next prefetch request using the new depth value.

If, in block 703, the accuracy value does not satisfy the upper threshold, then subsequent operations may depend on a value of a lower threshold (block 706). In the illustrated embodiment, if the upper threshold is not satisfied, then depth adjustor 210 compares the accuracy value to the lower threshold value. If the lower threshold is satisfied, e.g., the accuracy value is less than or equal to the lower threshold value, then the method moves to block 707 to determine if the current depth value is set to a minimum value. Otherwise, the method returns to block 702 to generate another prefetch request.

If the lower threshold is satisfied, then ensuing operations of method 700 may depend on the current value of the depth value (block 707). Depth adjustor 210, in one embodiment, compares the current depth value to a minimum depth value. If the current depth value is equal to, or in some embodiments, less than, the minimum depth value, prefetching may be suspended for the next time interval by disabling prefetch generator 212. The minimum value may be set to any suitable value, such as, for example, set to one. If the depth value is above the minimum value, then the method moves to block 708 to decrement the depth value. Otherwise, the method moves to block 709 to suspend prefetch requests.

If the current accuracy value satisfies the lower threshold and the current depth value is greater than the minimum value, then the depth value is decreased (block 708). Depth adjustor 210 decrements the depth value by a suitable decrement, such as one or two, for example. The method returns to block 702 to generate a next prefetch request using the new depth value.

If the current accuracy value satisfies the lower threshold and the current depth value is less than or equal to the minimum value, then prefetches are suspended (block 709). Prefetch generator 212 suspends the generation of new prefetch requests for the next time interval. Depth adjustor 210 may, in some embodiments, assert a suspend signal, which may result in prefetch generator 212 suspending the generation of new prefetch requests. In other embodiments, depth adjustor 210 may set the depth value to a particular value to indicate suspension of new prefetch requests. For example, depth adjustor 210 may set the depth value to zero to indicate the suspension. Logic in prefetch generator 212 may recognize the value of zero and cease to generate new requests until the depth value is greater than zero. At the end of the next time interval after the suspension of prefetch requests, or in other embodiments, after two or more time intervals after the suspension, depth adjustor 210 may indicate a resumption of prefetch requests. In various embodiments, depth adjustor 210 may indicate the resumption by de-asserting the suspend signal or by setting the depth value to a value greater than zero. Depth adjustor 210 may reset the depth value to any suitable value for the resumption of prefetch requests, such as, e.g., one, two, four, etc. The method ends in block 710.

It is noted that the method illustrated in FIG. 7 is merely an example embodiment. Although the operations illustrated in the method in FIG. 7 are depicted as being performed in a sequential fashion, in other embodiments, some of the operations may be performed in parallel or in a different sequence. For example, in some embodiments, operations of block 708 may be performed before operations of block 707. In some embodiments, additional operations may be included.

Figure 8:
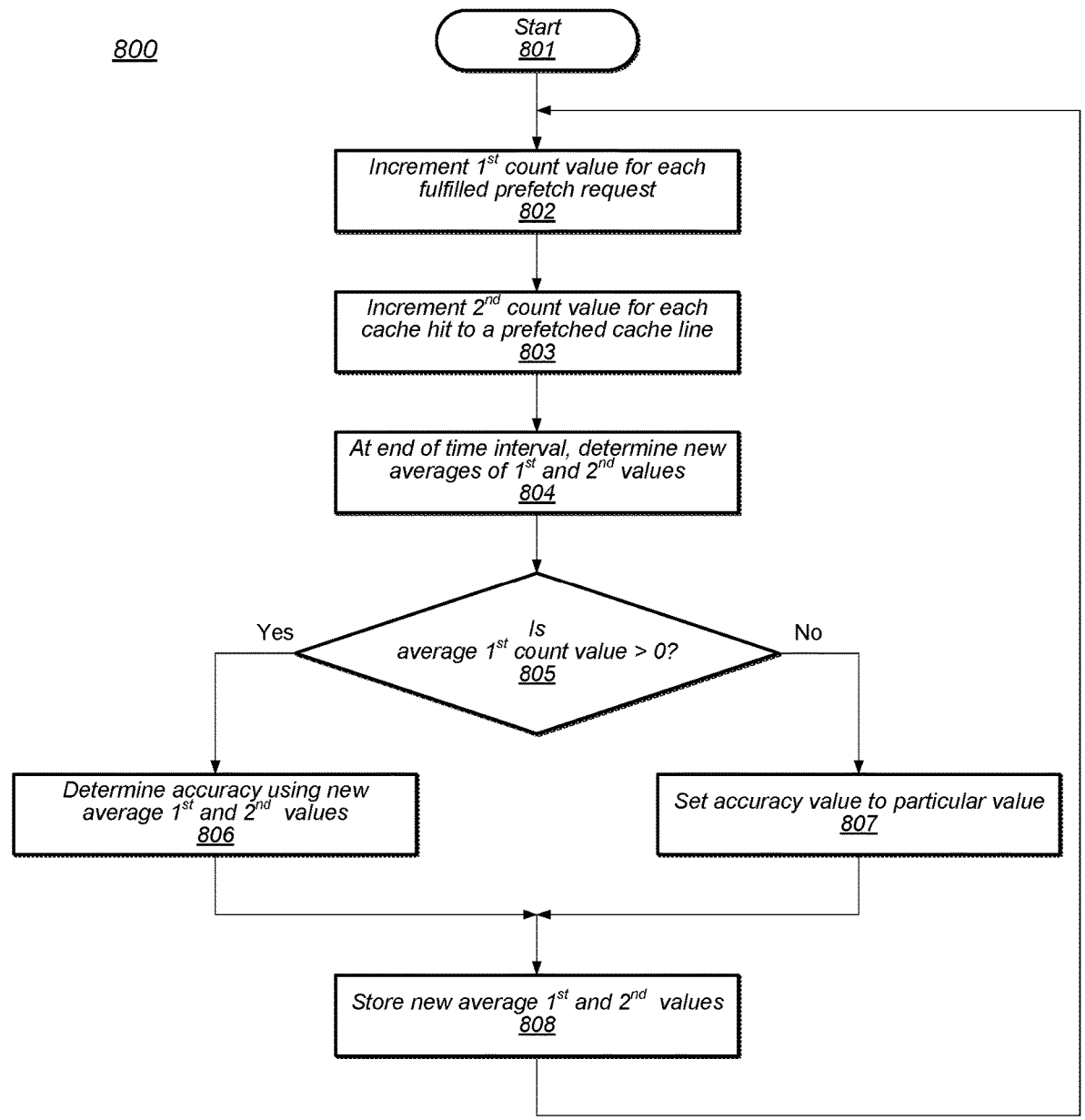
FIG. 8 shows a flow diagram of an embodiment of a method for determining accuracy of a memory prefetching sub-system.

Proceeding now to FIG. 8, a flow diagram of a method for determining accuracy of a memory prefetching sub-system is shown. Method 800 may be performed by an accuracy monitor, such as, for example, accuracy monitor 214. In some embodiments, method 800 may correspond to operations performed in block 603 of method 600 or in block 702 of method 700, in FIGS. 6 and 7, respectively. In other embodiments, method 800 may be performed in parallel with method 600 or method 700. Referring collectively to FIG. 2 and the flowchart in FIG. 8, the method may begin in block 801.

A first count value is incremented in response to issuing a prefetch request (block 802). In the illustrated embodiment, accuracy monitor 214 increments a current total count value when prefetch generator 212 issues a prefetch request to fetch pipeline 216 to fill one or more cache lines in cache memory 202. In some embodiments, accuracy monitor 214 may include a first counter circuit that is incremented, in response to issuing a prefetch request. When fetch pipeline 216 fulfills the prefetch request, one or more flag bits of the prefetched cache line are set to indicate that the line was prefetched.

A second count value is incremented for each cache hit to a prefetched cache line (block 803). Accuracy monitor 214, in the illustrated embodiment, increments a current used count value when a cache line in cache memory 202 is hit and the one or more flag bits of the hit cache line are set, indicating that the line was prefetched. In some embodiments, the one or more flag bits may be reset to an alternate value after the count value has been incremented to avoid counting a prefetched cache line more than once when determining a prefetch accuracy. To increment the current used count value, accuracy monitor 214, in some embodiments, may increment a second counter circuit.

In response to an end of a time interval, new average values are determined for the first and second values (block 804). In some embodiments, averages for the total count value and the used count value may be calculated and saved. In the illustrated embodiment, a weighted average total count value is determined by adding the current total count value to the average total count value and dividing the sum by two, thereby weighting the average towards the current total count value. In other embodiments, any suitable method for calculating an average value may be used. An average used count value may be determined using a similar method.

Subsequent operations of the method may depend on the average total count value (block 805). In the illustrated embodiment, accuracy monitor 214 determines if the average total count value is greater than zero. If the average total count value is greater than zero, then the method moves to block 806 to determine an accuracy value based on the average total and average used values. Otherwise, the method moves to block 807 to set the accuracy value to a particular value.

If the average total count value is greater than zero, then an accuracy value is determined using the average total and average used count values (block 806). In the illustrated embodiment, accuracy monitor 214 determines an accuracy value using the average total count value and the average used count value by, for example, determining a ratio of the two count values. In some embodiments, the average used count value is divided by the average total count value. This result may then be scaled to a desired range by multiplying the result by a particular value, such as, for example 1000. The calculations may, in some embodiments, be simplified by shifting binary values to the left or to the right in place of performing multiplication or division, respectively.

If the average total count value is zero, then an accuracy value is set to a particular value (block 807). If the average total count value is zero, then determining a ratio of the average used count value to the average total count value may not be possible. In such cases, the accuracy value may be set to a default value, such as, for example, to zero.

The determined average total count value and average used count value are stored (block 808). The average total count value and average used count value determined in block 804 are stored for a next time interval to be used when new current total and used count values are available at the end of the next time interval. The two average count values may be stored in registers within accuracy monitor 214, or in locations in a memory array accessible by accuracy monitor 214. Furthermore, the current total and used count values may be initialized to a suitable starting value in preparation for the next time interval. The accuracy value determined in either block 806 or 807 may be sent to other circuits, such as, e.g., depth adjustor 210. The method returns to block 802 to repeat the process for a next time interval.

It is noted that the method of FIG. 8 is merely an example. The operations illustrated in the method in FIG. 8 are depicted as being performed serially. In other embodiments, however, some of the operations may be performed in parallel or in a different sequence. In some embodiments, additional operations may be included.

Figure 9:
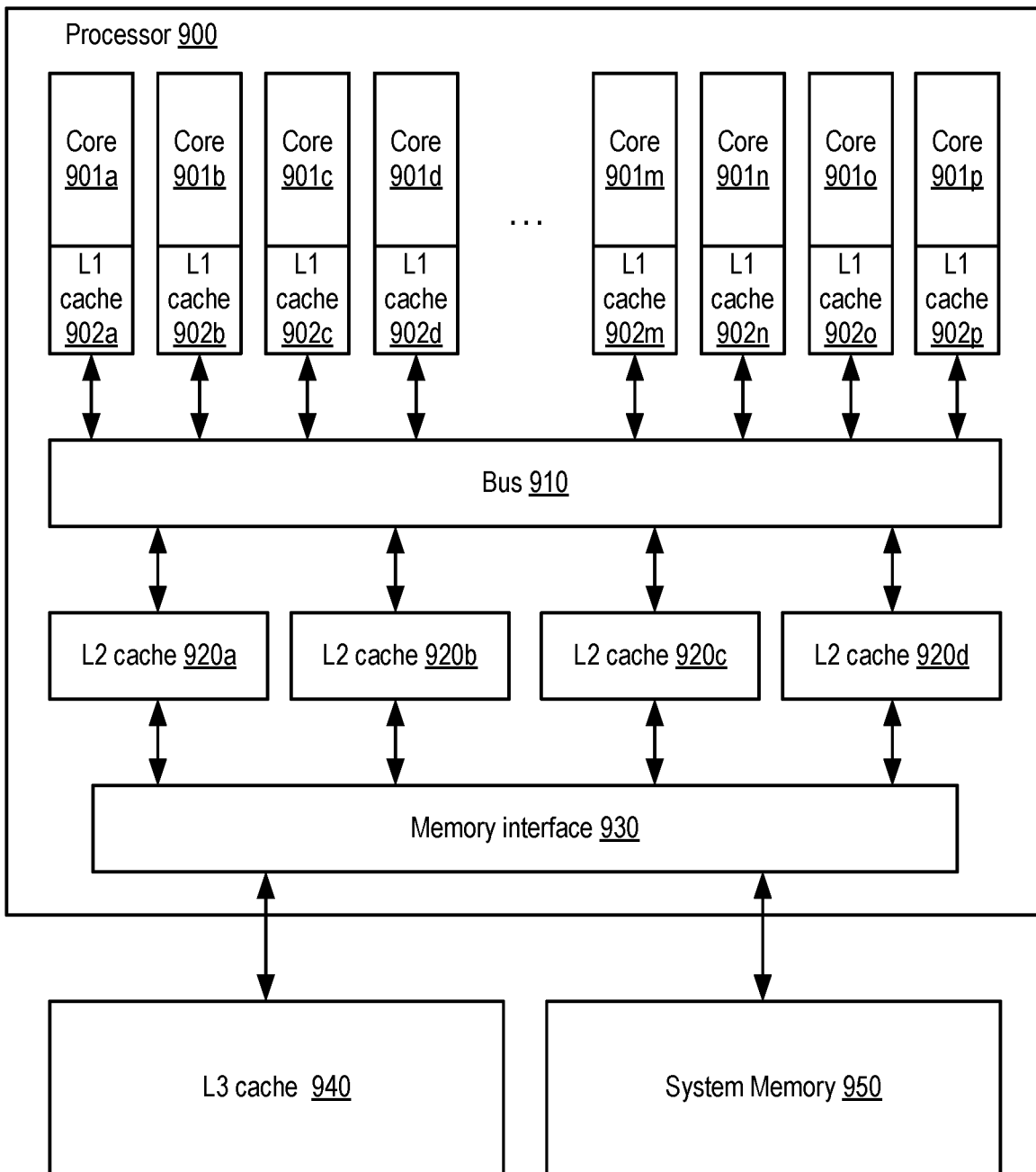
FIG. 9 depicts a block diagram illustrating an embodiment of a multi-core processor.

An example of a multicore processor is depicted in FIG. 9 as an example of a processor that may include one or more memory sub-systems as described herein. In the illustrated embodiment, processor 900 includes sixteen instances of a processor core, denoted as cores 901a through 901p (or simply 901a-p for brevity), although for clarity, not all instances are shown in FIG. 1. Cores 901a-p may each include a respective L1 cache 902a-902p. Cores 901a-p may be coupled to L2 caches 920a through 920d through bus 910. In addition, cores 901a-p may be coupled to memory interface 930 through L2 caches 920a-d. Memory interface 930 may be further coupled to L3 cache 940 as well as system memory 950. It is noted that in various embodiments, the organization of FIG. 1 may represent a logical organization rather than a physical organization, and other components may also be employed. For example, in some embodiments, cores 901a-p and L2 caches 920a-d may not connect directly to bus 910, but may instead interface with the bus through intermediate logic. L3 cache 940 and system memory may reside external to processor 900.

Cores 901a-p may be configured to execute instructions and to process data according to a particular Instruction Set Architecture (ISA). In one embodiment, cores 901a-p may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 901 may be configured to execute multiple threads concurrently, where each thread may include a set of instructions that may execute independently of instructions from another thread. In various embodiments, it is contemplated that any suitable number of cores 901a-p may be included within a processor, and that each of cores 901a-p may concurrently process some number of threads.

L1 caches 902a-p may reside within cores 901a-p or may reside between cores 901a-p and bus 910. L1 caches 902a-p may be configured to cache instructions and data for use by their respective cores 901a-p. In some embodiments, each individual cache 902a-p may be implemented using set-associative or direct-mapped techniques. For example, in one embodiment, L1 caches 902a-p may be 16 kilobyte (KB) caches, where each L1 cache 902a-p is 2-way set associative with a 16-byte line size, although other cache sizes and geometries are possible and contemplated.

Each cache line in a cache may include the data being stored, flags corresponding to the coherency state, and an address tag. A cache tag may include all or a part of the original address of the data being stored in the cache line, an index indicating in which cache line the cached data is stored, and an offset indicating where in each cache line the specific data is located. A given processor core may access a cache with a direct address of the memory location, a translated address based on lookup tables, or through an address calculated based on an instruction's address mode. In addition to a coherency state of the cache line, flags may include one or more bits indicating if the information stored in the respective cache line were fetched in response to a cache miss or prefetched by a prefetch circuit.

Bus 910 may be configured to manage data flow between cores 901a-p and the shared L2 caches 920a-d. In one embodiment, bus 910 may include logic (such as multiplexers or a switch fabric, for example) that allows any core 901a-p to access any bank of L2 cache 920a-d, and that conversely allows data to be returned from any bank of L2 cache 920a-d to any core 901a-p. Bus 910 may be configured to concurrently process data requests from cores 901a-p to L2 cache 920a-d as well as data responses from L2 cache 920a-d to cores 901a-p. In some embodiments, bus 910 may include logic to queue data requests and/or responses, such that requests and responses may not block other activity while waiting for service. Additionally, in one embodiment, bus 910 may be configured to arbitrate conflicts that may occur when multiple cores 901a-p attempt to access a single bank of L2 cache 920a-d or vice versa. It is noted that in various embodiments, bus 910 may be implemented using any suitable type of interconnect network, which, in some embodiments, may correspond to a physical bus interconnect.

L2 caches 920a-d may be configured to cache instructions and data for use by a respective set of cores 901a-p. For example, L2 cache 920a may store data for cores 901a-d, L2 cache 920b for cores 901e-h, L2 cache 920c for cores 901i-1, and L2 cache 920b may similarly be coupled to cores 901m-p. As the number of cores 901 is increased, the size and/or number of L2 caches 920 may also be increased in order to accommodate the additional cores 901. For example, in an embodiment including 16 cores, L2 cache 920 may be configured as 4 caches of 2 MB each, with each cache including 4 individual cache banks of 512 KB, where each bank may be 16-way set associative with 512 sets and a 64-byte line size, although any other suitable cache size or geometry may also be employed.

In some embodiments, L2 caches 920a-b may include various queues and buffers configured to manage the flow of data to and from bus 910 as well as to and from L3 cache 940. For example, such embodiments of L2 cache 920a-b may implement a fill buffer configured to store fill data arriving from memory interface 930, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). In some embodiments, multiple banks of L2 cache 920 may share single instances of certain data structures or other features. For example, a single instance of a fill buffer may be shared by multiple banks of an L2 cache 920 in order to simplify the physical implementation (e.g., routing and floor-planning) of L2 cache 920a-b. Despite this sharing, individual banks of L2 caches 920a-b may be configured to concurrently and independently process accesses to data stored within the banks when such concurrency is possible.

Like L1 caches 901a-p and L2 caches 920a-b, L3 cache 940 may be configured to cache instructions and data for use by cores 901a-p. In some embodiments, L3 cache may be implemented on a separate memory chip external to processor 900 and accessed through memory interface 930. In other embodiments, L3 cache may be implemented on the same die as processor 900, in which case, L3 cache 940 may be accessed directly. Similar to L1 caches 902a-p, L3 cache 940 may be implemented using set-associative or direct-mapped techniques. For example, in one embodiment, L3 cache 940 may be an 8 megabyte (MB) cache, where the 8 MB bank is 16-way set associative with a 16-byte line size, although other cache sizes and geometries are possible and contemplated.

The cache hierarchy may be established such that any core 901 may first access its respective L1 cache 902. If the access to L1 cache 902 is a miss, then the respective L2 cache 920 may be accessed. If the L2 cache 920 access is a miss, then L3 cache 940 may be accessed next. If all three cache levels miss, then system memory 950 may be accessed through memory interface 930.

Memory interface 930 may be configured to manage the transfer of data between L2 caches 920a-b and L3 cache 940 and/or system memory 950 in response to L2 fill requests and data evictions, for example. In some embodiments, multiple instances of memory interface 930 may be implemented, with each instance configured to control a respective bank of L3 cache 940 or system memory 950. Memory interface 930 may be configured to interface to any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 930 may be configured to support interfacing to multiple different types of memory, such that L3 cache 940 and system memory 950 may be composed of two or more of the listed types. In other embodiments, L3 cache 940 may correspond to a reserved portion of system memory 950.

Respective prefetch circuitry, such as, for example, prefetch circuits 104 or 204 in FIGS. 1 and 2, respectively, may be coupled to any suitable level of cache memory in processor 900. In one embodiment, for example, a respective prefetch circuit 204 may be coupled to each of L2 caches 920a-d. Respective depth adjustors 210, prefetch generators 212, and accuracy monitors 214 may be coupled to each of L2 caches 920a through 920d. In such an example, prefetch circuits 204 may issue prefetch requests, including multi-group prefetch requests, for each of the four cores 901 supported by a particular L2 cache 920. Referring to L2 cache 920a, for example, accuracy data may be tracked for each of cores 901a-d. Accuracy monitor 214 and depth adjustor 210 may include a set of counters and/or registers corresponding to each of cores 901a-d. In some embodiments, prefetch generator 212 may generate multi-group prefetch requests with different depth values for each core 901a-d based on respective accuracy data. In other embodiments, depth adjustor 210 may adjust a single depth value for all four cores 901a-d based on an overall accuracy of prefetch circuit 204.

It is noted that FIG. 9 is merely an example of a multicore processor. In other embodiments, processor 900 may include network and/or peripheral interfaces. The physical structure may not be represented by FIG. 9 as many other physical arrangements may be possible and are contemplated.

It is further noted that the systems and circuits described herein may be implemented in any suitable digital logic process. For example, some embodiments may utilize a Complementary Metal-Oxide Semiconductor Field-Effect Transistor (CMOS) process. Such CMOS logic process may utilize planar devices, non-planar devices, or a combination of the two. Circuits designed in a CMOS process may include various combinations of smaller logic circuits, such as, for example, invertors, AND gates, OR gates, NAND gates, NOR gates, as well as data capturing circuits such as flip-flops and latches.

Numerous variations and modifications will become apparent to those skilled in the art once the above disclosure is fully appreciated. It is intended that the following claims be interpreted to embrace all such variations and modifications.

What is claimed is:

1. A method, comprising:
   generating, by a prefetch circuit, a multi-group prefetch request to retrieve information from a memory to store in a cache memory using a predicted address, wherein the multi-group prefetch request is assigned a current depth value corresponding to a number of fetch groups to retrieve;
   storing the generated multi-group prefetch request in a queue, including an original depth value based on the assigned depth value; and
   while the generated multi-group prefetch requests is stored in the queue:
      generating an accuracy value based on a cache hit rate of prefetched information over a particular time interval;
      modifying the current depth value to an updated depth value in response to a determination that the accuracy value is outside of a particular range of accuracy values;
      assigning subsequently generated prefetch requests the updated depth value; and
      subsequent to modifying the current depth value, completing the stored multi-group prefetch request by issuing a plurality of single-group prefetch requests using the original depth value.

2. The method of claim 1, further comprising:
   increasing the current depth value in response to determining that the accuracy value satisfies an upper threshold of the particular range of accuracy values; and
   decreasing the current depth value in response to determining that the accuracy value satisfies a lower threshold of the particular range of accuracy values.

3. The method of claim 2, further comprising maintaining the current depth value in response to determining that the current depth value is equal to a maximum allowed depth value.

4. The method of claim 2, further comprising suspending issuing prefetch requests for at least a next time interval in response to determining that the current depth value is equal to a minimum allowed depth value.

5. The method of claim 1, further comprising:
   tracking, over the particular time interval, a first value indicative of an amount of information stored, in response to one or more prefetch requests, in the cache memory; and
   tracking, over the particular time interval, a second value indicative of a number of cache hits of cache lines that include information that is stored in the cache memory in response to at least one prefetch request.

6. The method of claim 5, further comprising determining the accuracy value based on the first value, the second value, and a weighted running average of the amount of information stored, in response to one or more prefetch requests.

7. An apparatus, comprising:
   a prefetch generator circuit configured to:
      generate a multi-group prefetch request that includes a predicted address and a current depth value indicative of a number of fetch groups to be retrieved from a memory and stored in a cache;
      store the generated multi-group prefetch request in a queue, including an original depth value based on the current depth value;
      using the predicted address, issue an initial single-group prefetch request associated with the multi-group prefetch request;
   an accuracy monitor circuit configured to generate an accuracy value based on a cache hit rate of prefetched information over a particular time interval; and
   a depth adjustor circuit configured to modify the current depth value to an updated depth value in response to a determination that the accuracy value is outside of a particular range of accuracy values, wherein subsequently generated prefetch requests are assigned the updated depth value; and
   wherein the prefetch generator circuit is further configured to, subsequent to modifying the current depth value, complete the stored multi-group prefetch request by issuing an additional one or more single-group prefetch requests using the original depth value.

8. The apparatus of claim 7, wherein to modify the current depth value, the depth adjustor circuit is further configured to:
   increase the current depth value in response to a determination that the accuracy value satisfies an upper threshold of the particular range of accuracy values; and
   decrease the current depth value in response to a determination that the accuracy value satisfies a lower threshold of the particular range of accuracy values.

9. The apparatus of claim 8, wherein to increase the current depth value, the depth adjustor circuit is further configured to maintain the current depth value in response to a determination that the current depth value is equal to a maximum allowed depth value.

10. The apparatus of claim 8, wherein to decrease the current depth value, the depth adjustor circuit is further configured to suspend issuing prefetch requests for at least a next time interval in response to a determination that the current depth value is equal to a minimum allowed depth value.

11. The apparatus of claim 7, wherein to generate the accuracy value, the accuracy monitor circuit is further configured to:
   track, over the particular time interval, a first value indicative of an amount of information stored, in response to one or more prefetch requests, in the cache; and
   track, over the particular time interval, a second value indicative of a number of cache hits of cache lines that include information that is stored in the cache in response to at least one prefetch request.

12. The apparatus of claim 1, wherein the accuracy monitor circuit is further configured to determine the accuracy value based the first value, the second value, and a weighted running average of the amount of information stored, in response to one or more prefetch requests.

13. The apparatus of claim 7, wherein the prefetch generator circuit is further configured to, for each of the additional one or more single-group prefetch requests, increment a value of the predicted address by an amount based on a size of a cache line.

14. A system, comprising:
a processor core;
a memory configured to store information for use by the processor core;
a cache memory configured to fetch and store information from the memory; and
a prefetch circuit configured to:
generate a multi-group prefetch request to retrieve information from the memory to store in the cache memory using a predicted address, wherein the multi-group prefetch request is assigned a current depth value indicative of a number of fetch groups to retrieve;
store the generated multi-group prefetch request in a queue, including an original depth value based on the assigned depth value; and
while the generated multi-group prefetch request is stored in the queue:
generate an accuracy value based on a cache hit rate of prefetched information over a particular time interval;
modify the current depth value to an updated depth value in response to a determination that the accuracy value is outside of a particular range of accuracy values, wherein subsequently generated prefetch requests are assigned the updated depth value; and
subsequent to modifying the current depth value, complete the stored multi-group prefetch request by issuing a plurality of single-group prefetch requests using the original depth value.

15. The system of claim 14, wherein to modify the current depth value, the prefetch circuit is further configured to:
increase the current depth value in response to a determination that the accuracy value satisfies an upper threshold value of the particular range of accuracy values; and
decrease the current depth value in response to a determination that the accuracy value satisfies a lower threshold value of the particular range of accuracy values.

16. The system of claim 15, wherein to increase the current depth value, the prefetch circuit is further configured to maintain the current depth value in response to a determination that the current depth value is equal to a maximum allowed depth value.

17. The system of claim 15, wherein to decrease the current depth value, the prefetch circuit is further configured to suspend issuing prefetch requests for at least a next time interval in response to a determination that the current depth value is equal to a minimum allowed depth value.

18. The system of claim 14, wherein to generate the accuracy value, the prefetch circuit is further configured to:
track, over the particular time interval, a first value indicative of an amount of information stored, in response to one or more prefetch requests, in the cache memory; and
track, over the particular time interval, a second value indicative of a number of cache hits of cache lines that include information that is stored in the cache memory in response to at least one prefetch request.

19. The system of claim 18, wherein the prefetch circuit is further configured to determine the accuracy value based on the first value, the second value, and a weighted running average of the amount of information stored, in response to one or more prefetch requests.

20. The system of claim 14, wherein the cache memory is further configured to:
include a prefetch identifier with a cache line that is filled using a prefetched request; and
clear the prefetch identifier in response to a determination that the cache line has been hit by a cache request.

* * * * *

UNITED STATES PATENT AND TRADEMARK OFFICE
CERTIFICATE OF CORRECTION

PATENT NO.         : 10,579,531 B2
APPLICATION NO.    : 15/691351
DATED              : March 3, 2020
INVENTOR(S)        : Lee et al.

Page 1 of 1

It is certified that error appears in the above-identified patent and that said Letters Patent is hereby corrected as shown below:

In the Specification

In Column 4, Line 50, delete "and or" and insert -- and/or --, therefor.

In Column 13, Line 23, delete "Accuracy" and insert -- accuracy --, therefor.

In Column 17, Line 41, delete "901i-1," and insert -- 901i-l, --, therefor.

In the Claims

In Column 20, Line 65, in Claim 12, delete "claim 1," and insert -- claim 11, --, therefor.

Signed and Sealed this
Seventeenth Day of November, 2020

Andrei Iancu
*Director of the United States Patent and Trademark Office*